United States Patent
Geier et al.

(10) Patent No.: US 10,388,095 B2
(45) Date of Patent: Aug. 20, 2019

(54) WIRELESS KEY CLOSING DEVICE FOR A MOTOR VEHICLE, MOTOR VEHICLE, AND METHOD FOR OPERATING THE CLOSING DEVICE

(71) Applicant: AUDI AG, Ingolstadt (DE)

(72) Inventors: Tobias Geier, Dachau (DE); Frank Müller, Feucht (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/327,527

(22) PCT Filed: Jun. 23, 2017

(86) PCT No.: PCT/EP2017/065549
§ 371 (c)(1),
(2) Date: Feb. 22, 2019

(87) PCT Pub. No.: WO2018/036689
PCT Pub. Date: Mar. 1, 2018

(65) Prior Publication Data
US 2019/0180542 A1    Jun. 13, 2019

(30) Foreign Application Priority Data

Aug. 24, 2016    (DE) .......................... 10 2016 215 901

(51) Int. Cl.
*G07C 9/00* (2006.01)
*B60R 25/24* (2013.01)
*H04K 3/00* (2006.01)

(52) U.S. Cl.
CPC .......... *G07C 9/00309* (2013.01); *B60R 25/24* (2013.01); *H04K 3/42* (2013.01);
(Continued)

(58) Field of Classification Search
CPC ...... G07C 9/00309; G07C 2009/00555; G07C 2009/00769; B60R 25/10; B60R 25/24;
(Continued)

(56) References Cited

U.S. PATENT DOCUMENTS

| 4,595,902 A | * | 6/1986 | Proske | ..................... B60R 25/24 340/5.64 |
| 6,429,768 B1 | * | 8/2002 | Flick | ...................... B60R 25/04 307/10.5 |

(Continued)

FOREIGN PATENT DOCUMENTS

| DE | 3240945 A1 | 5/1984 |
| DE | 3324956 A1 | 1/1985 |

(Continued)

OTHER PUBLICATIONS

Notification of Transmittal of Translation of the International Preliminary Report on Patentability dated Mar. 7, 2019, in connection with corresponding international Application No. PCT/EP2017/065549 (6 pgs.).

(Continued)

*Primary Examiner* — An T Nguyen
(74) *Attorney, Agent, or Firm* — Maier & Maier, PLLC

(57) ABSTRACT

A locking device for a motor vehicle. A transmitting device, which is designed to send out a request signal into a surroundings of the motor vehicle in dependence on a predetermined triggering event, as well as a receiving device, which is designed to receive, within a predetermined time interval from the sending of the request signal in a predetermined frequency region, a response signal of a radio key from the surroundings, and a control device, which is designed, in event of a response signal received within the time interval, to unlock at least one lock of the locking device. An evaluation module is designed so that the transmitting device sends out an interference radio signal after (Continued)

the sending of the request signal within the time interval at least at one radio frequency lying outside the frequency region.

8 Claims, 1 Drawing Sheet

(52) U.S. Cl.
CPC ... *H04K 3/825* (2013.01); *G07C 2009/00396* (2013.01); *G07C 2009/00555* (2013.01); *G07C 2009/00769* (2013.01); *H04K 2203/18* (2013.01); *H04K 2203/22* (2013.01)

(58) Field of Classification Search
CPC ........ B60R 25/102; H04K 3/42; H04K 3/825; H04K 2203/18; H04K 2203/22
See application file for complete search history.

(56) References Cited

U.S. PATENT DOCUMENTS

| | | | | |
|---|---|---|---|---|
| 7,053,499 | B2* | 5/2006 | Fischer | B60R 25/24 180/287 |
| 7,898,386 | B2* | 3/2011 | Wisnia | B60R 25/209 340/5.62 |
| 8,319,616 | B2* | 11/2012 | Girard, III | G01S 11/06 340/426.36 |
| 8,930,087 | B2* | 1/2015 | Bongiorno | B60R 25/24 701/48 |
| 10,279,777 | B2* | 5/2019 | Lemoult | B60R 25/04 |
| 2003/0098615 | A1* | 5/2003 | Fischer | B60R 25/24 307/10.5 |
| 2003/0206286 | A1* | 11/2003 | Bogh-Andersen | G01S 7/483 356/28.5 |
| 2015/0130589 | A1* | 5/2015 | Miyazawa | G07C 9/00309 340/5.61 |
| 2016/0107610 | A1* | 4/2016 | Lemoult | B60R 25/04 340/426.11 |
| 2017/0237468 | A1* | 8/2017 | Dobyns | H04K 3/42 455/41.1 |
| 2017/0294062 | A1* | 10/2017 | Van Wiemeersch | G07C 9/00111 |
| 2018/0089918 | A1* | 3/2018 | Murray | G07C 9/00007 |
| 2019/0012859 | A1* | 1/2019 | Leonhardt | G07C 9/00309 |

FOREIGN PATENT DOCUMENTS

| | | |
|---|---|---|
| DE | 10149344 A1 | 4/2003 |
| DE | 10155123 A1 | 5/2003 |
| DE | 10301146 A1 | 7/2004 |
| DE | 102014010668 A1 | 1/2015 |
| WO | 2015/013087 A1 | 1/2015 |

OTHER PUBLICATIONS

Search Report dated Mar. 14, 2017 in corresponding German Application No. 102016215901.1; 21 pages.
International Search Report and Written Opinion dated Sep. 15, 2017 in corresponding International Application No. PCT/EP2017/065549; 24 pages.

* cited by examiner

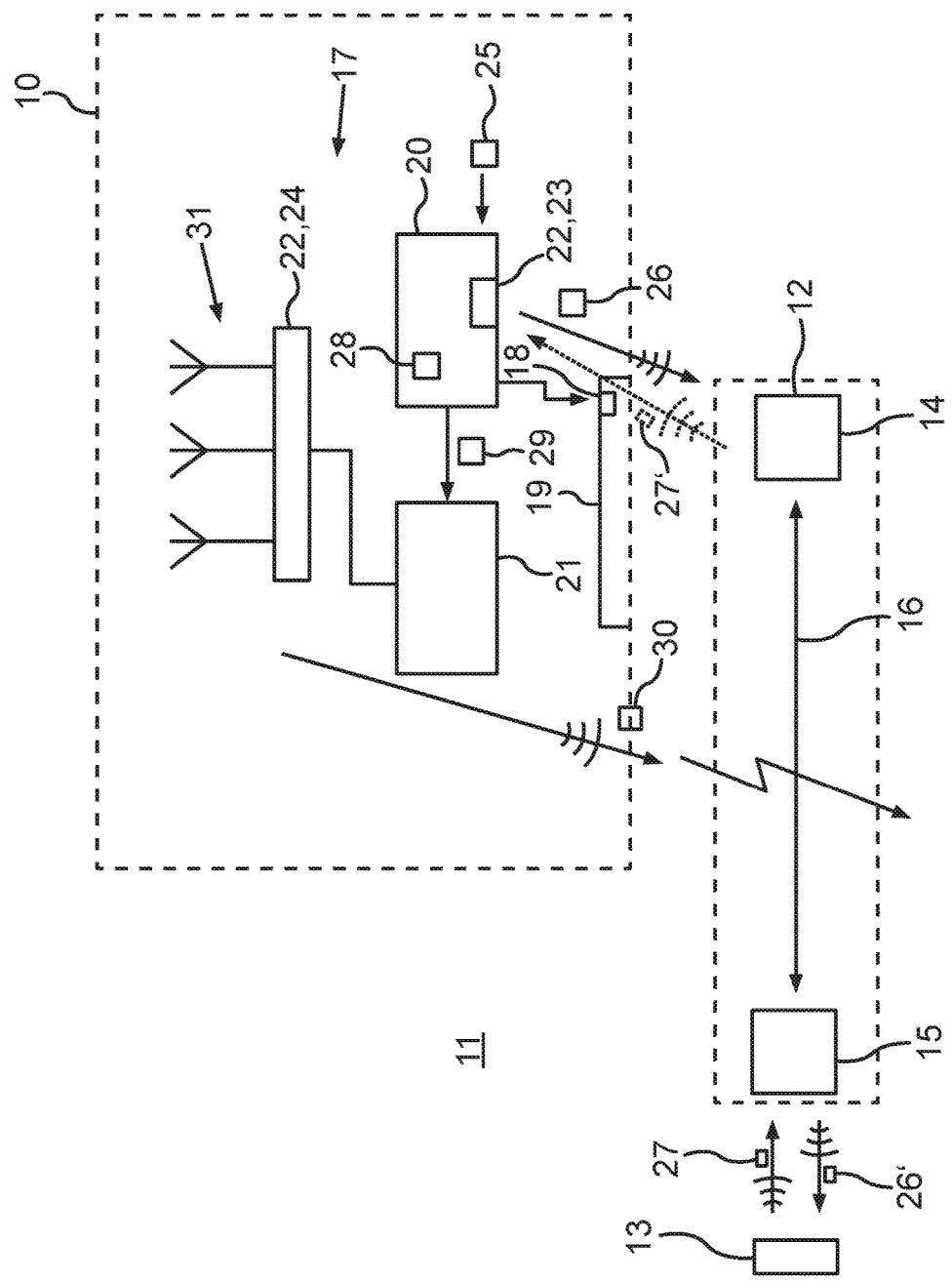

WIRELESS KEY CLOSING DEVICE FOR A MOTOR VEHICLE, MOTOR VEHICLE, AND METHOD FOR OPERATING THE CLOSING DEVICE

FIELD

The invention relates to a locking device for a motor vehicle, by means of which the motor vehicle can be unlocked by using a so-called radio key. The invention also includes the motor vehicle with the locking device and a method for operating the locking device.

BACKGROUND

A locking device which can be unlocked by means of a radio key may provided for a transmitting device seeking or stimulating the radio key in the surroundings of the motor vehicle by means of a request signal and then authorizing the key with the aid of a response signal from the radio key. With the request signal and/or the response signal, predetermined data and/or secrets are exchanged via a radio interface. Due to the limited transmission ranges of the request signal and the response signal, as well as an optional locating of the radio key, the use of the radio key is confined to a predetermined surrounding area bordering on the motor vehicle. Outside the surrounding area, the radio key does not work.

In a so-called relay attack on the locking device, for example to steal the motor vehicle, the request signal of the locking device is detected in the surroundings of the motor vehicle and extended over a larger distance than the mentioned surrounding area. For this, a theft device may be utilized, having a part near the vehicle and a part near the key. By means of the part near the vehicle, the request signal of the locking device is received and transmitted by means of radio communication, such as via a WLAN connection (WLAN—Wireless Local Area Network) or a mobile radio connection to the part near the key. This then sends out the request signal once again in the original frequency region. Thus, the surrounding area is enlarged beyond the originally defined boundaries of the surrounding area. If the radio key then answers with its response signal, this response signal will again be transmitted by the part of the theft device near the key via the mentioned radio communication to the part near the vehicle and here it is once more sent out in the original frequency region of the response signal to the motor vehicle. In this way, the motor vehicle can respond in the same way as if the radio key were operating immediately in the surrounding area itself. Hence, accessing and starting of the motor vehicle is then also possible if the radio key is located outside the surrounding area, i.e., in a dwelling, for example.

A theft device which can be operated in the described manner is known for example from DE 10 2014 010 668 A1. The radio key and the locking device in this case transmit their signals at a level at which a signal change occurs in a special pattern.

From WO 2015/013087 A1 it is known how to use time-changing frequencies for the transmitting of the request signal and/or the response signal in a locking device.

It is known from DE 101 55 123 A1 that a locking device can recognize a radio link between said part of a theft device near the vehicle and the part near the key and then not release the vehicle. For this, a determination is made as to whether a signal received outside a useful frequency band is permanently present or whether it is a manipulated code signal.

SUMMARY

The problem which the invention proposes to solve is to impede the use of a theft device for the described range extension (relay attack).

The invention provides a locking device for a motor vehicle. In already known manner, the locking device has a transmitting device, which is designed to send out a request signal into a surroundings of the motor vehicle in dependence on a predetermined triggering event. As the triggering event, the activating of a door latch of the motor vehicle and/or the approaching of a person to the motor vehicle may be detected or recognized, for example. The request signal may be a radio signal, in particular a so-called LF signal (LF—low frequency), which is sent out in a frequency region less than one Megahertz, especially less than 500 kilohertz. If a vehicle key is located in the surroundings, it can send out a response signal in response to the request signal. The locking device accordingly has a receiving device, which is designed to expect or to receive, within a predetermined time interval from the sending of the request signal in a predetermined frequency region, the response signal of the radio key from the surroundings. The response signal in particular is a so-called HF signal (HF—high frequency), which is sent out in a frequency region lying above one Megahertz, especially above 100 Megahertz. A frequency bandwidth of the response signal is also known.

The locking device has a control device designed to unlock at least one lock of the locking device if the response signal is received within said time interval. The time interval may be, for example, a length or duration in the range of 0.1 seconds to 5 seconds. After the time interval runs out, the control device no longer responds to an incoming response signal. In other words, the at least one lock of the locking device is only unlocked upon receiving the response signal within the time interval.

Now, the following solution according to the invention is provided in order to prevent a radio key in a relay attack with said forwarding of the request signal and the response signal from causing the locking device to open the at least one lock at a distance greater than a predetermined minimum distance.

The locking device comprises an evaluation module, which is designed so that the transmitting device sends out an interference radio signal before and/or during, but at least after the sending of the request signal within or during said time interval, i.e., for example, a noise and/or a predetermined signal pattern. The interference radio signal is sent out at least at a frequency lying outside said frequency region for the response signal. In other words, the evaluation device does not disrupt the response signal of the radio key itself by means of the interference radio signal. Instead, transmission power is generated at this at least one radio frequency for the at least one radio frequency lying outside the frequency region of the response signal. The interference radio signal is characterized in that it is emitted in order to interrupt or disrupt radio traffic already existing at the at least one radio frequency. In other words, it violates a communications protocol or does not even follow any communications protocol. If other radio traffic is present at the radio frequency, the interference radio signal will thus be superimposed on this other radio traffic, for example a communication between two transceivers, and thus this radio communication will be disrupted. The evaluation module in particular is designed to generate or emit the interference radio signal in dependence on an activation signal of the control device or directly or indirectly in dependence on the triggering event.

The invention affords the advantage that the mentioned theft device for carrying out the described relay attack can be disrupted by generating the interference radio signal at the radio frequency at which the signal extension is carried out and in this way the response signal of the radio key cannot be presented at the motor vehicle, or not in good time. Hence, the attempt to present the response signal from a distant radio key to the motor vehicle within the mentioned time interval will be thwarted. For this, the interference radio signal may disrupt the forwarding of the request signal and/or the returning of the response signal. In other words, the radio communication between the part of the theft device near the vehicle and the part near the key is disrupted and/or interrupted by means of the interference radio signal.

The invention also includes optional modifications whose features produce additional benefits.

Preferably, the evaluation module is designed to provide the at least one frequency of the interference radio signal such that a radio frequency of a WLAN standard and/or a mobile radio standard (such as GSM, LTE, UMTS) is comprised or contained in it. In other words, a WLAN communication and/or mobile radio communication is disrupted by means of the interference radio signal. In this way, a relay attack camouflaged as a WLAN communication and/or mobile radio communication can also be disrupted.

The following modification is preferably provided in order to avoid ongoing interference in a WLAN connection and/or mobile radio connection that was established for example by the operator of the motor vehicle using a smartphone. The interference radio signal will preferably bring about a reinitialization of a mobile radio connection and/or WLAN connection. This will cause only a brief interruption of a voice connection and/or a data connection of a smartphone, for example. In addition or alternatively, it may be provided to decrease a signal-to-noise ratio of a mobile radio connection and/or WLAN connection in a predetermined area around the motor vehicle by at least a factor of 2. This is also known as jamming. In other words, the transmitting device will be operated as a so-called mobile phone jammer. This applies in particular only in a region up to a distance of 5 meters around the motor vehicle. The transmission power to be adjusted for this for the interference radio signal may either be measured by means of the receiving device, which detects the reception power of the mobile radio connection and/or WLAN connection being disrupted, or alternatively it is possible to assume for this a maximum power of the mobile radio connection and/or WLAN connection, such as can be found in the respective radio standard. The worsening of the signal-to-noise ratio by a factor of at least 2 produces the benefit of a delay in the continuation or further operation of the mobile radio connection and/or WLAN connection during which the transceivers operating the mobile radio connection and/or WLAN connection will adapt. This may be enough to accomplish a delay which is large enough so that a response signal forwarded by a relay attack cannot be presented within the mentioned time interval at the motor vehicle.

Even less interference is caused by the interference radio signal in a voice connection and/or a data connection of a smartphone, for example, in that the evaluation module is designed to generate the interference radio signal in pulsed manner. This may occur in such a way that, even though the relaying of the request signal and/or response signal is delayed or disturbed, a telephone connection (voice connection) for example will only have transient dropouts and interference noise (such as crackling), making it possible for the user of a smartphone, for example, to continue the communication.

In order to specifically disrupt with the interference radio signal only a frequency region which is actually being used for said relay attack, it can be provided that the receiving device is designed to detect, before and/or during the time interval, a radio communication in which the motor vehicle is not involved outside the frequency region of the response signal, and to generate the interference radio signal only if such a radio communication has been detected. In other words, a transmitter will be detected in the surroundings of the motor vehicle whose transmission power is for example greater than a predetermined threshold value. It may then be assumed that this transmitter is located close to the motor vehicle and may possibly be used for the relaying of the request signal of the locking device. It is possible to determine whether this involves a radio communication in which the motor vehicle is not involved by considering or checking or polling existing radio connections that are being maintained by the transmitting device and the receiving device of the motor vehicle itself.

So as not to cause any interference for noninvolved parties at a distance greater than a predetermined maximum distance by means of the interference radio signal, it is preferably provided that the transmitting device is designed to adjust a transmitting strength of the interference radio signal, i.e., a transmission power and/or transmitter amplitude for example, so that a transmission range of the interference radio signal is at most three times as large, especially at most twice as large, as a transmission range of the request signal of the transmitting device. For example, the range can be measured by comparing the signal strength of the interference radio signal and the request signal. Thus, for example, in the case of a range twice as large, the transmission power of the interference radio signal is twice as large as that of the request signal at a given distance.

Said motor vehicle according to the invention is obtained by providing the locking device according to the invention in a motor vehicle. The motor vehicle according to the invention is preferably designed as a car, in particular a passenger car.

The method according to the invention results from operating the locking device according to the invention. In other words, the transmitting device of the locking device sends out the request signal into the surroundings of the motor vehicle in dependence on the predetermined triggering event and the receiving device of the locking device determines whether a response signal of a radio key is received from the surroundings within a predetermined time interval from the sending of the request signal in a predetermined frequency region. At least one lock of the locking device is unlocked by a control device of the locking device upon receiving the response signal. In order to prevent or thwart a relay attack, the evaluation module sends out by means of the transmitting device an interference radio signal in dependence on the triggering event during the time interval at least at one radio frequency lying outside said frequency region. The transmitting device used and the receiving device used may each be devices known from the prior art. Furthermore, a different transmitter may be used to generate the interference radio signal than the transmitter used for the request signal. In the same way, a different receiver can be used for the detecting of an existing radio communication than the one provided for receiving a response signal.

The invention also includes modifications of the method according to the invention having features already described in connection with the modifications of the locking device according to the invention. For this reason, the corresponding modifications of the method according to the invention shall not be further described here.

BRIEF DESCRIPTION OF THE DRAWING

In the following, an exemplary embodiment shall be described. For this, FIG. 1 shows a schematic representation of one embodiment of the motor vehicle according to the invention during a relay attack.

DETAILED DESCRIPTION

The exemplary embodiment explained below is a preferred embodiment of the invention. In the exemplary embodiment, the described components of the embodiment each time constitute individual features of the invention, to be viewed independently of each other, which modify the invention even independently of each other and therefore should also be considered to be part of the invention, individually or in a combination other than the one shown. Furthermore, the described embodiment may also be amplified by other of the already described features of the invention.

FIG. 1 shows a motor vehicle 10, which may be for example a car, especially a passenger car or a truck. In addition to the motor vehicle 10, there are also represented in the surroundings 11 of the motor vehicle 10 a theft device 12 and a radio key 13. The theft device 12 may have one part 14 near the vehicle and one part 15 near the key. The two parts 14, 15 stand in connection with each other via a radio communication 16.

The motor vehicle 10 may have a locking device 17, by means of which an electrically and/or pneumatically movable lock 18 of a vehicle door 19 can be unlocked. By means of the locking device 17, multiple locks may also be controlled in the described manner. The locking device 17 makes it possible to unlock the motor vehicle 10 wirelessly by means of the radio key 13. The locking device 17 may have for this purpose in the depicted motor vehicle 10 a control device 20, an evaluation module 21 and a sending and receiving device or transceiver device 22 for short, which is divided up in the motor vehicle 10 such that a first transceiver part 23 is provided at the control device 20 for the communication or the data exchange with the radio key 13. A second transceiver part 24 may be provided in connection with mobile radio connections and/or WLAN connections, which may also be coupled, for example, to an infotainment system (information entertainment system) of the motor vehicle 10.

The control device 20 can recognize a triggering event 25, such as the activating of a door latch of the vehicle door 19 and then send out a request signal 26 as a radio signal into the surroundings 11 in response to the recognized triggering event 25 by means of the transceiver part 23. If the owner of the motor vehicle 10 with the radio key 13 is not located in the surroundings 11, but instead the radio key 13 is located in a dwelling, for example, the radio key 13 will be outside the transmission region of the request signal 26 and therefore does not respond to the request signal 26.

However, with the aid of the theft device 12, the described relay attack can be carried out. For this, the request signal 26 is received by the part 14 near the vehicle and transmitted by the radio communication 16 to the part 15 near the key, which may be placed for example in front of said dwelling.

By means of the part 15 near the key, the request signal 26 can be reproduced, so that a reproduced request signal 26' is sent out, which is received by the radio key 13. The radio key 13 responds to the reproduced request signal 26' in the same way that it would to the request signal 26 itself in the surroundings 11. The radio key 13 accordingly generates a response signal 27, which however cannot be received by the transceiver part 23 on account of the great distance to the radio key 13. Instead, the response signal 27 is received by the part 15 near the key and sent by the radio communication 16 to the part 14 near the vehicle. The part 14 near the vehicle can generate a reproduced response signal 27', which is received by the transceiver part 23 of the locking device 17 and recognized in the same way as the response signal 27 itself.

However, this relay attack will be prevented or impeded in the motor vehicle 10. The control device 20 only activates or unlocks the lock 18 if the response signal 27 or the reproduced response signal 27' is received within a predetermined time interval 28 by the transceiver part 23 after the sending of the request signal 26.

The theft device 12 is not able to generate the reproduced response signal 27' within the time interval 28. Namely, in response to the recognized triggering event 25 the control device 20 can put out a start signal or activation signal 29 to the evaluation module 21. Depending on the activation signal 29, the evaluation module 21 can send out an interference radio signal 30 by means of the transceiver part 24 via an antenna assembly 31. The interference radio signal 30 may be designed such that it disrupts the radio communication 16. In this way, the communication between the parts 14, 15 of the theft device 12 is disrupted or at least delayed, since data for example has to be transmitted repeatedly via the radio communication 16.

The interference radio signal 30 can be generated in dependence on whether the radio communication 16 is detected by the transceiver part 24. The interference radio signal 30 may be attuned to a frequency of the radio communication 16 so that the frequency of the radio communication 16 agrees with the frequency of the interference radio signal 30. For example, with the aid of the antenna assembly 31 it is also possible to carry out a directional location to identify the position of the part 14 near the vehicle based on the radio signals of the radio communication 16 and then the interference radio signal 30 is beamed out directionally.

Thus, the surroundings 11 can be scanned or checked for active frequency channels of a radio communication 16 before and during a generating of a request signal 26 by the motor vehicle 10. Upon detecting a communication link in the form of a radio communication 16, this can be interpreted as an active attack scenario of a theft device 12. An interference radio signal 30 can then be generated as an impulse or pulse on the recognized or scanned frequency of the radio communication 16 in order to prevent a timely transmitting of the request signal and/or the response signal 27.

Thus, an attack scenario calling for a range extension (relay attack) of the vehicle radio signals is detected and averted.

The scanning of the radio communication 16 and the sending out of a pulse of an interference radio signal 30 can be done by means of the sending/receiving device (transceiver part 24) installed in the motor vehicle 10, with which a mobile radio connection and/or a WLAN connection can be provided in the motor vehicle 10. The evaluation module 21 may be configured for example as a controller and can decide with the aid of the measured values of the radio communication 16 as to the frequency or frequencies and/or the signal strength or intensity and/or direction for sending out the pulse of the interference radio signal 30.

In order to avoid a permanent detecting or monitoring and thus a needless energy consumption, the evaluation module 21 will be triggered or activated in the described manner by the control device 20 by means of the activation signal 29. This will ensure that an interdicting or disrupting or interrupting of the range extension of the theft device 12 will occur only at the time of the critical communication during the time interval 28.

Thus, on the whole, the example shows how the recognizing and prevention of attacks by a range extension can be made possible by the invention in motor vehicles with radio key equipment.

The invention claimed is:

1. A locking device for a motor vehicle, comprising:
   a transmitting device, which is designed to send out a request signal into a surroundings of the motor vehicle in dependence on a predetermined triggering event;
   a receiving device, which is designed to receive, within a predetermined time interval from the sending of the request signal in a predetermined frequency region, a response signal of a radio key from the surroundings; and
   a control device, which is designed, in the event of a response signal received within the time interval, to unlock at least one lock of the locking device,
   wherein an evaluation module is designed so that the transmitting device sends out an interference radio signal after the sending of the request signal within the time interval, at least one radio frequency lying outside the frequency region.

2. The locking device as claimed in claim 1, wherein the evaluation module is designed to provide at least one frequency of a WLAN standard and/or a mobile radio standard as at least one radio frequency of the interference radio signal.

3. The locking device as claimed in claim 1, wherein the interference radio signal is designed to bring about a reinitialization of a mobile radio connection and/or WLAN connection and/or a decreasing of a signal-to-noise ratio of a mobile radio connection and/or WLAN connection in a predetermined area around the motor vehicle by at least a factor of 2.

4. The locking device as claimed in claim 1, wherein the evaluation module is designed to generate the interference radio signal in pulsed manner.

5. The locking device as claimed in claim 1, wherein the receiving device is designed to detect, before and/or during the time interval, outside the frequency region, a radio communication in which the motor vehicle is not involved, and to generate the interference radio signal only if the radio communication has been detected.

6. The locking device as claimed in claim 1, wherein the transmitting device is designed to adjust a transmitting strength of the interference radio signal so that a transmission range of the interference radio signal is at most three times as large, especially at most twice as large, as a transmission range of the request signal.

7. A motor vehicle having a locking device as claimed in claim 1.

8. A method for operating a locking device of a motor vehicle, comprising:
   a transmitting device of the motor vehicle sends out a request signal into a surroundings of the motor vehicle in dependence on a predetermined triggering event and a receiving device of the motor vehicle determines whether a response signal of a radio key is received from the surroundings within a predetermined time interval from the sending of the request signal in a predetermined frequency region, and at least one lock of the locking device is unlocked by a control device of the locking device upon receiving the response signal, wherein an evaluation module sends out by the transmitting device an interference radio signal in dependence on the triggering event during the time interval, at least one radio frequency lying outside the frequency region.

* * * * *